H. W. JACOBS & H. H. LANNING.
VALVE MECHANISM FOR GAS COMPRESSORS.
APPLICATION FILED JUNE 24, 1912.
1,144,360.
Patented June 29, 1915.
4 SHEETS—SHEET 4.
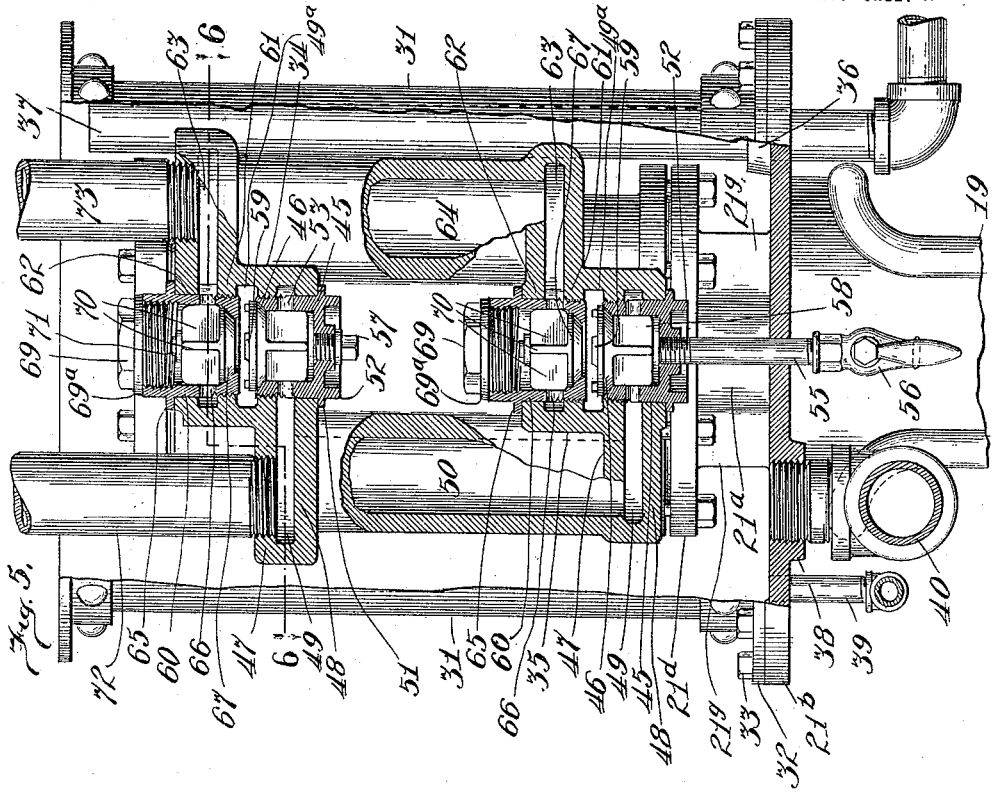
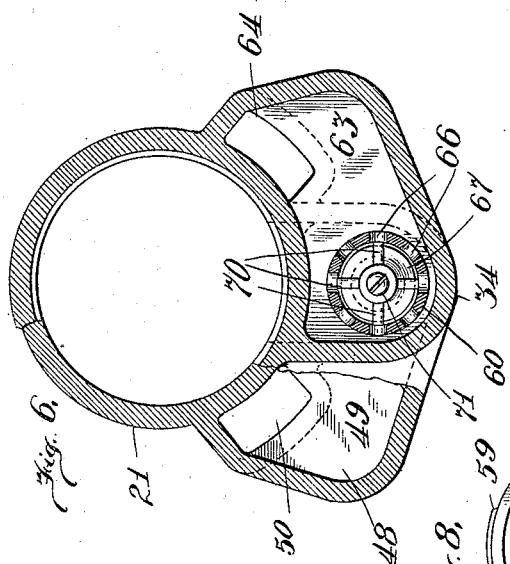
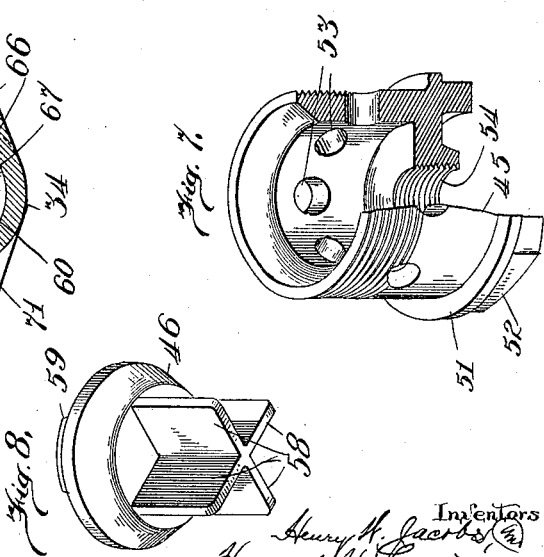

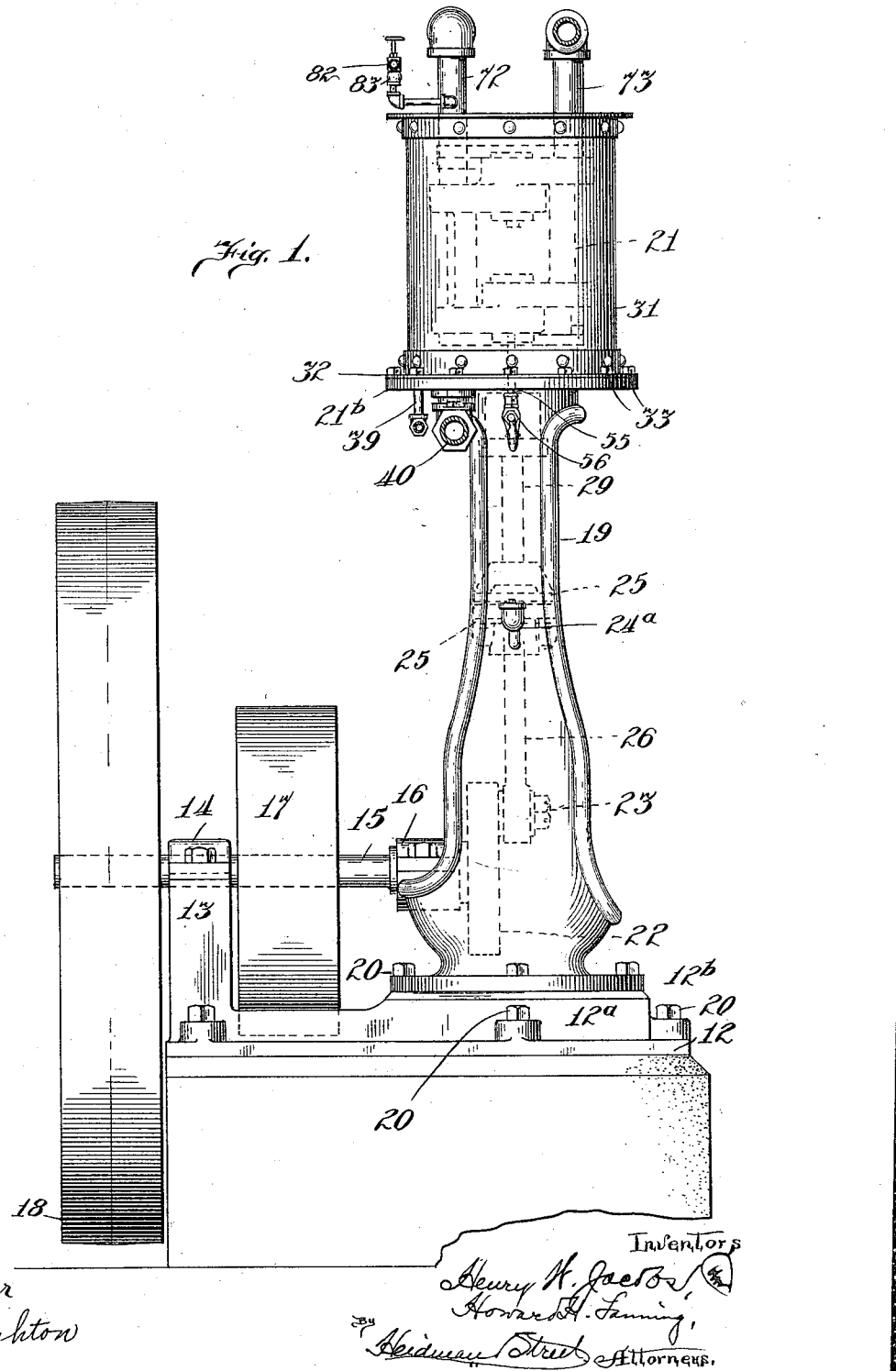

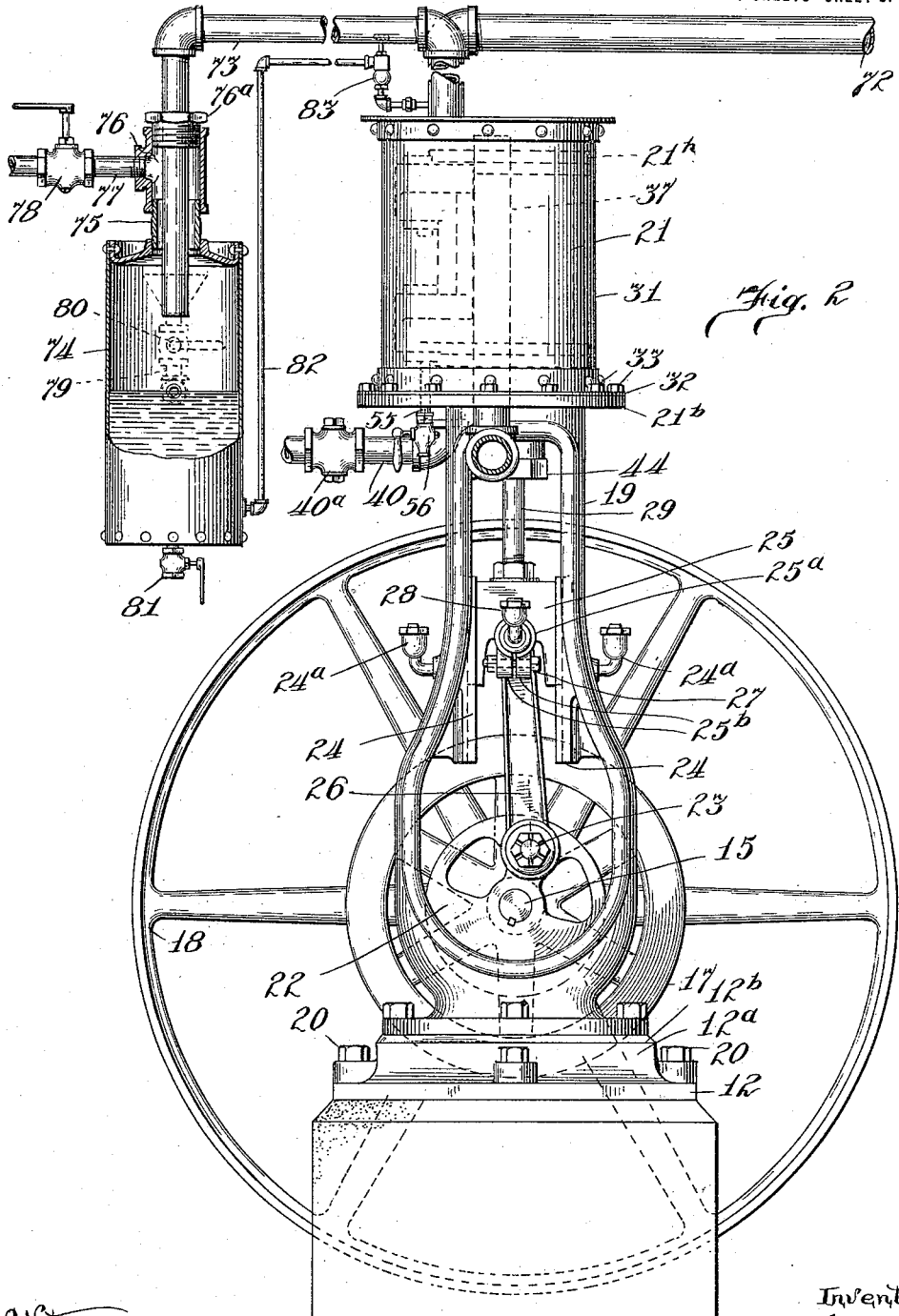

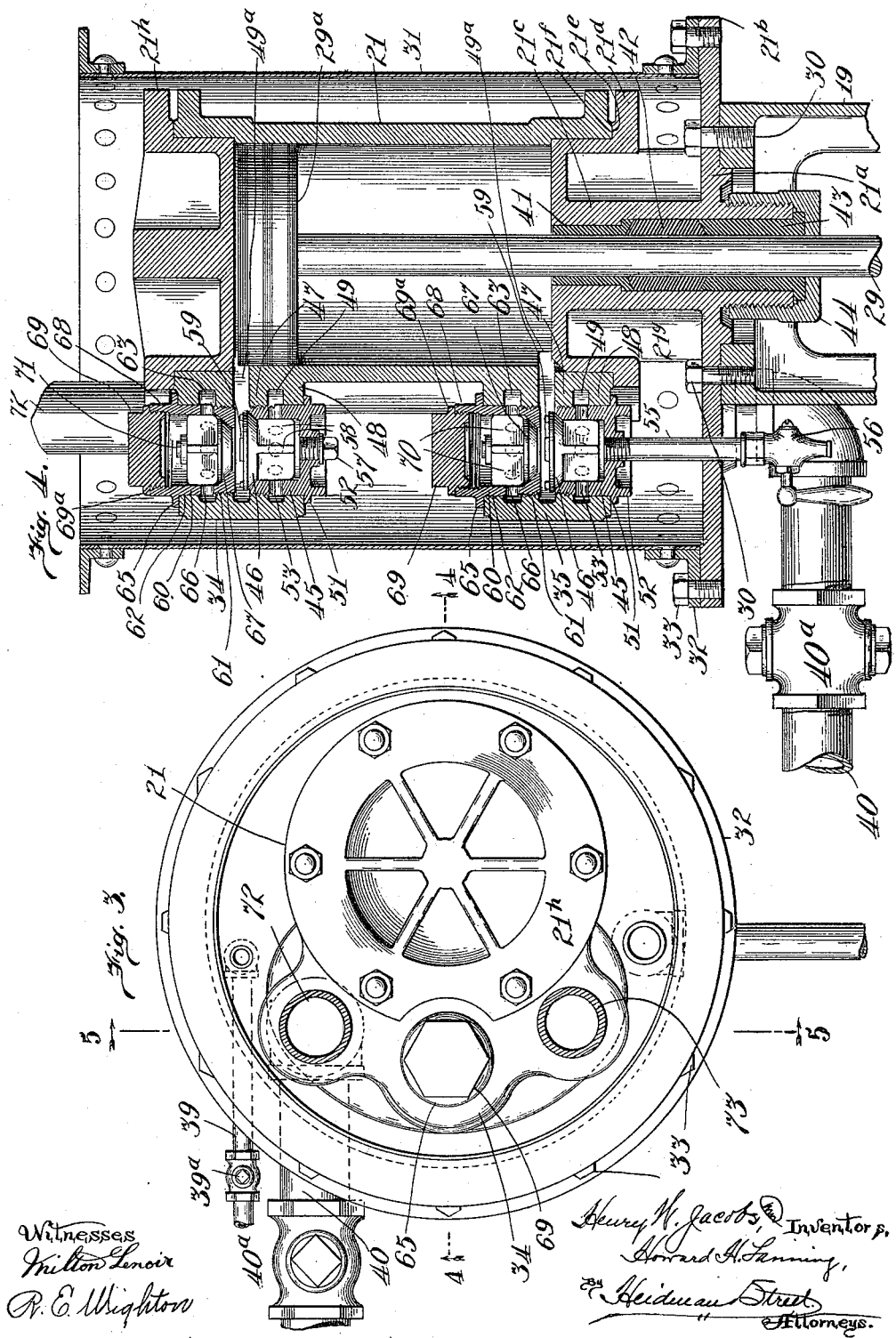

UNITED STATES PATENT OFFICE.

HENRY W. JACOBS AND HOWARD H. LANNING, OF TOPEKA, KANSAS.

VALVE MECHANISM FOR GAS-COMPRESSORS.

1,144,360. Specification of Letters Patent. Patented June 29, 1915.

Application filed June 24, 1912. Serial No. 705,645.

*To all whom it may concern:*

Be it known that we, HENRY W. JACOBS and HOWARD H. LANNING, citizens of the United States, and residents of Topeka, in the county of Shawnee and State of Kansas, have invented certain new and useful Improvements in Valve Mechanism for Gas-Compressors, of which the following is a description, reference being had to the accompanying drawings, which form a part of our specification.

Our invention relates to gas compressing machines, and more particularly to a machine adapted to be used for compressing pure oxygen.

The object of our invention is the provision of a machine which will be simple and at the same time efficient and durable and so constructed that all of its parts will be readily accessible for inspection or repairs; whereby pure oxygen can be safely compressed to any desired pressure.

In the drawings:—Figure 1 is a front elevation of our improved machine. Fig. 2 is a side elevation thereof with a portion of the mechanism shown in section. Fig. 3 is a top plan view with the intake and outlet pipes in section and the lower portion of the base, fly wheel and pulley omitted. Fig. 4 is a sectional view taken on the line 4—4 of Fig. 3, looking in the direction of the arrows. Fig. 5 is a sectional view taken on the line 5—5 of Fig. 3, looking in the direction of the arrows. Fig. 6 is a cross sectional view taken on the line 6—6 of Fig. 5, looking in the direction of the arrows. Fig. 7 is a detail view in perspective and partially in section of one of the valve cages.

In the specific exemplification of our invention, the intake and discharge valves, illustrated in the drawings, are preferably of the puppet type and are fitted into removable cages which are suitably mounted within the housings 34 and 35 formed integral with the cylinder 21. As the compressor or cylinder illustrated is of the double acting type, two inlet and two discharge valves are employed; the cylinder being of course provided with the proper inlet and outlet ports or channels as hereinafter set forth. The lower part of housings 34 and 35 receive the inlet valve cages 45, 45. These cages are made in the form of cups with the upper edge of the walls or rims beveled so as to provide suitable valve seats for the inlet valves 46, see Fig. 7. The outside face of the upper portion of the cages 45, 45, are screw threaded so that the cages may be screwed into the threaded openings in the partitions 47 of the housings 34 and 35, see Figs. 4 and 5; while the remainder of the cages fit snugly into the holes formed in the partitions or walls 48 of housings 34 and 35; the walls 47 and 48 being separated from each other, as more clearly shown in Figs. 4 and 5, to provide the intake ports 49 which communicate with each other by means of the passages 50, see Fig. 5. Valve cages 45, 45, are preferably provided with the annular flanges 51 which are adapted to bear against the lower outside surface of housings 34 and 35, as clearly shown in Figs. 4 and 5, and in order to insure a tight joint, a gasket may be interposed between the flanges and the lower outer surface of the cages and thus prevent any leakage of gas. In order to facilitate the proper securing or removal of the cages 45, and permit of the use of a wrench, the outer extended portion 52 of the cages may be made hexagonal as illustrated in Fig. 7. The side walls of cages 45 are provided with a series of radially extending holes 53 so located that when the cages are properly screwed into place, the holes 53 will register with the intake ports 49 and thus provide communication between ports 49 and the interior of cages 45 below the seat of the valves 46.

The bottom of the intake valve cage 45 is preferably provided with a tappet hole as more clearly shown in Fig. 7 at 54 into which is screwed a short pipe 55, see Fig. 4. This pipe 55 projects downwardly through the lower flange 21$^b$ of the lower cylinder head and terminates in a pet cock 56. As the valve cages 45 are identical and might be interchanged, the hole in the bottom of inlet valve cage 45 seated in housing 34 is closed by a suitable screw plug as shown at 57 so as to prevent the gas escaping therethrough. The purpose in providing the lower cage with the pipe and pet cock, is to enable the removal of any liquid that may condense or otherwise collect in the lower cage 45, which cage is the lowest point in the intake passages of the cylinder.

The valves 46 are provided with a surface ground to conform with the seats of the cages 45 so that the gas cannot pass about the valves when they are seated. The lower faces of valves 46 are provided with wings or guiding members 58, the edges or side surfaces whereof are machined so as to provide a free working fit within the cup shaped cavity or interior of valve cages 45; the wings or guiding members 58 properly control or guide the movements of the valves to their seats. The upper surfaces of the valves 46 are provided with the bosses or projections 59 which are so arranged that they will strike against the adjacent surface or lower end of the discharge valve cages arranged immediately above, and thus limit the lift of the intake valves 46 from their seats.

The upper portions of housings 34 and 35 are provided with suitable openings to receive the discharge valve cages 60. The inner ends of cages 60, like the inner ends of cages 45, have externally threaded portions which fit into the threaded portions or walls 61, see Figs. 4 and 5; while the remainder or plain portion of cages 60 fit snugly into the holes formed in walls 62 of housings 34 and 35; the walls 61 and 62 being separated so as to provide the discharge ports 63; which ports communicate with the discharge passage 64, see Fig. 5. The valve cages 60, like the valve cages 45, are preferably provided with annular flanges as shown at 65, which bear upon the upper or outlet walls of housings 34 and 35. If desired, a suitable gasket may be placed intermediate of the annular flanges 65 and the walls of the housings so as to insure gas tight connection. The side walls of cages 60 are provided with a series of radially extending holes 66 which are adapted to register with the discharge ports 63 when the valve cages 60 have been properly screwed into place, thus providing communication between discharge ports 63 and the interior of cages 60 above discharge valves 67. The valve cages 60 may be provided with hexagonal portions 68 in order to facilitate the use of a wrench for inserting or removing the cages. The discharge valve cages 60 are open at both ends as clearly shown in Figs. 4 and 5, with the openings in the lower ends thereof beveled and properly formed so as to provide seats within the cages 60 for the discharge valves 67 which are mounted so as to move inwardly; the valves 67 normally closing the openings in the lower ends of the cages 60. The openings in the upper ends of cages 60 are preferably threaded internally to receive the threaded ends of plugs 69; the plugs 69 being provided with flanges 69ª which bear on the outer upper edges of cages 60 and form tight joints, thus preventing the gas from escaping through the openings in the upper ends of the cages. The large openings in the upper ends of the cages are for the purpose of permitting the valves 67 to be inserted into the cages. These plugs may be provided with hexagonal or other suitable portions or surfaces so as to facilitate the use of a wrench when it is desired to insert or remove the plugs. The discharge valves 67 are provided with suitable guiding portions or wings 70 on the upper faces of the valves; the edges of the wings or guide portions being machined to a suitable diameter so as to permit the valves to work freely within the cages 60. The upper intersecting surfaces of the wings 70 are preferably provided with a projection or button as shown at 71, see Fig. 6, which is provided with a slot adapted to receive a screw driver or similar implement thus providing means for grinding the valves 67 to conformity with their seats; at the same time the projections or buttons 71 will act as a means for limiting the maximum lift of the discharge valves 67, because the projections 71 will strike against the lower side of plugs 69 when the desired maximum lift has been attained by the valves 67.

Intermediate of the walls or partitions 47 and 61, in both housings 34 and 35, a gas passage or port 49ª is provided. These ports 49ª communicate with both ends of cylinder 21, as more clearly shown in Fig. 4, and permit of communication being established between the cylinder and inlet ports 49 and discharge or outlet ports 63, when the respective inlet and discharge valves are operated.

The conduit or pipe 72 constitutes the intake pipe leading from the gasometer, or other suitable source of supply; and this pipe is preferably screwed into the opening in wall 47 of housing 34, thus conveying gas into the upper port or chamber 49 which latter communicates with lower chamber or port 49 by means of the passage 50. The discharge chambers or ports 63, which are connected by discharge passage 64, permit the discharge of compressed gas to flow into discharge pipe 73 which connects with the upper wall or partition 62 of housing 34.

The operation of our improved invention is as follows:—Power is applied to impart reciprocating motion to piston 29ª inside of cylinder 21. As the piston 29ª travels alternately from end to end within cylinder 21, it draws in the gas through intake pipe 72 which latter communicates with port 49 allowing the gas to flow into the port and gas passage 50 communicating with port 49 at the lower end of the cylinder. Assuming the piston in the position shown in Fig. 4, its downward stroke will induce the gas to lift intake valve 46 in housing 34 and allow the gas to enter port 49ª which communicates with the bore of the cylinder. The return or upward stroke of the piston 29ª will induce the lifting of intake valve 46 located in the lower housing 35 and permit the gas to enter port 49ª at the bottom of the cylinder 21. The upward or return stroke of the piston will also compress the gas in the upper part of the cylinder and drive it back through port 49ª in housing 34, lifting discharge valve 67 and allow the compressed gas to enter port 63 which communicates with discharge pipe 73. It is of course understood that the continued reciprocation of the piston will act in like manner on the gas in the lower portion of the cylinder 21, as previously described, compressing the gas, forcing it into port 49ª thereby lifting discharge valve 67 located in housing 35, permitting the gas to enter port 63, which communicates with chamber or passage 64 having communication at its upper end with discharge pipe 73.

We have shown and described what we believe to be the best form of our invention, but the same may be modified in certain details without, however, departing from the spirit of our invention, and we do not wish, therefore, to be understood as limiting ourselves to the exact construction shown and described, but

What we claim and wish to secure by Letters Patent, is:—

1. In a gas compressor, a cylinder provided with a port at each end thereof, the combination of valve-receiving housings arranged about said ports at opposite ends of the cylinder, said housings being provided with intake and discharge ports on opposite sides of the cylinder port with which they are adapted to communicate, valve cages removably secured in opposite ends of said housings, and valves reciprocatingly mounted in the inner or opposing ends of said cages.

2. In a gas compressor, a cylinder provided with a port at each end thereof, the combination of a housing formed integral with each end of the cylinder and coincident with said ports, said housings being each provided with an intake and outlet port arranged on opposite sides of the cylinder port and adapted to be alternately put into communication therewith, said housings being provided with openings extending therethrough, a set of valve cages removably secured in opposite ends of each of said openings in the housings, and a valve mounted in each of said cages whereby communication between the intake and discharge ports of the housings and the ports at opposite ends of the cylinder is controlled.

3. In a gas compressor, provided with a cylinder having ports at opposite ends thereof, the combination of housings secured to both ends of the cylinder and provided with intake and discharge ports arranged on opposite sides of the ports of the cylinder and adapted to alternately have communication with the ports at opposite ends of the cylinder, said housings being provided with openings extending therethrough, a valve cage removably secured in each end of the opening in said housings, said cages being provided with openings in the side walls adapted to register with the ports in said housings, and a valve mounted at the inner end of each cage whereby communication between the ports of the cylinder and the ports in the housings is controlled.

4. In a gas compressor, having a cylinder provided with ports at opposite ends thereof, the combination of housings formed integral with opposite ends of the cylinder and provided with intake and discharge ports adapted to be alternately put into communication with the ports of the cylinder, said housings being provided with passages extending therethrough, a valve cage removably secured in each end of said passages, said cages being provided with openings in the side walls adapted to register with the intake and discharge ports in said housings, respectively, a puppet valve mounted at the inner end of each of said cages, passages whereby communication between the intake ports and between the discharge ports in the housings at opposite ends of the cylinder is established, and intake and discharge conduits communicating with the intake and discharge ports respectively.

5. In a gas compressor, comprising a cylinder provided with ports at opposite ends of the cylinder, the combination of housings formed integral with the ends of the cylinder, said housings being provided with intake and outlet ports adapted to have communication with the ports of the cylinder and provided with openings extending longitudinally therethrough, a set of valve cages removably secured in opposite ends of said openings and arranged to provide an intermediate gas passage connected with the ports of the cylinder, the adjacently presented ends of said cages being provided with valve seats, valves mounted in said cages and adapted to take onto said seats, and means whereby the maximum movement of the valves is controlled.

6. In a gas compressor, comprising a cylinder provided with ports, the combination of housings formed integral with the ends of the side walls of the cylinder, said housings being provided with ports adapted to have communication with the ports of the cylinder and having openings extending longitudinally therethrough, a set of valve cages, open at both ends, removably secured in opposite ends of said longitudinal openings, the adjacent ends of the cages being provided with valve seats, the side walls of the cages having openings adapted to register with the ports in the housings, valves provided with guide portions adapted to engage the inner walls of the cages, means whereby the maximum movement or lift of the valves is controlled, and means whereby the opposite ends of the valve cages are closed, the means in the end of the lowest cage being adapted to permit the draining of said cage.

7. In a gas compressor, comprising a cylinder having removable heads, the combination of housings formed integral with opposite ends of the side walls of the cylinder, said housings being provided with ports, one port of each housing communicating with the cylinder interior, the housings being provided with openings extending therethrough and at an angle to the ports, valve cages removably secured in opposite ends of the longitudinal openings in said housings, the adjacent ends of the cages being provided with valve seats, puppet valves mounted on said seats and provided with guide portions extending into said cages and in contact with the side walls thereof, the cages being provided with openings in the side walls adapted to register with the ports in the housings, means removably secured to the cages whereby access to the interior may be had, passages arranged intermediate of one of the ports of each of the housings at opposite ends of the cylinder whereby communication between the selected ports of each housing may be established to the outside of the cylinder, an intake conduit communicating with one of said passages, a discharge conduit communicating with the other passage, means whereby the maximum lift of the valves may be controlled, and a piston reciprocatingly mounted in said cylinder.

8. In a gas compressor provided with a cylinder having a port at opposite ends thereof, the combination of a housing secured to each end of the side wall of the port of the cylinder, each of said housings being provided with ports arranged to communicate with the cylinder at the same end thereof, a set of valve cages secured in each of said housings and in opposite ends thereof, the adjacent ends or cages being provided with valve seats, a valve mounted in each of said cages, means secured to the valves whereby the maximum lift thereof may be controlled, the cages being provided with openings in the side walls arranged to register with the ports in the housings, and means whereby the lowest valve cage may be drained, with an intake and a discharge conduit communicating with said housings.

9. In a gas compressor provided with a cylinder having a port at each end thereof, the combination of a housing secured to each end of the side wall of the cylinder, each housing being provided with a series of ports or passages adapted to communicate with opposite ends of the cylinder, a set of valve cages removably secured in opposite ends of each of said housings, said cages being provided with openings in the side walls adapted to register with a port or passage in the respective end of the housing, the adjacent ends of the cages being provided with valve seats, a valve reciprocatingly mounted in said cages and provided with wing portions extending into the cages and in engagement with the side walls thereof, means whereby the maximum lift of the valves may be controlled, means removably secured to the opposite ends of said cages whereby access to the interior may be had, gas passages intermediate of the housings at opposite ends of the cylinder, with an intake conduit communicating with one of said passages, and a discharge conduit communicating with the other of said passages.

10. In a gas compressor, provided with a cylinder having ports at opposite ends thereof, the combination of a housing secured to each end of the cylinder and to the side wall thereof, each housing being provided with intake and discharge ports adapted to have communication with the ports at opposite ends of the cylinder and provided with openings extending through the housings at an angle to said ports, gas passages intermediate of the intake ports and the discharge ports of the housings at opposite ends of the cylinder respectively, a set of valve cages removably secured in opposite ends of the openings in each housing, said cages being provided with openings in the side walls adapted to register with the ports in said housings at the respective ends thereof, a valve mounted in each of said cages whereby communication between the ports of the cylinder and the ports of the housings is controlled, means whereby the intake passage intermediate of the housings at opposite ends of the cylinder may be drained, and a piston reciprocatingly mounted in the cylinder.

11. In a gas compressor, provided with a cylinder having ports at opposite ends thereof, the combination of a housing secured to each end of the cylinder and to the side wall thereof, the housings being provided with intake and discharge ports adapted to communicate with the ports of the cylinder and having openings extending through the housings at an angle to the ports, a set of valve cages removably secured in opposite ends of each opening in said housings, the adjacent ends of the cages being provided with valve seats and openings in the side walls of the cages adapted to register with the ports in the housings at the respective ends thereof, a passage intermediate of the intake ports of each housing and the discharge ports of each housing respectively, an intake conduit communicating with the passage intermediate of the intake ports, a discharge conduit communicating with the passage intermediate of the discharge ports, and means whereby the lowest point in the intake passage of the cylinder may be drained.

12. In a gas compressor provided with a cylinder, the combination of a housing integral with the wall of the cylinder, said housing being provided with a series of passages and an opening extending therethrough at an angle to said passages, one of said passages constituting an intake port, the other passage constituting a discharge port, while the third passage communicates with the cylinder interior, valve-cages removably secured in opposite ends of said opening, the adjacent ends of said cages being provided with valve seats while the side walls of the cages are provided with one or more ports adapted to register with the passage in the respective end of the housing, and valves adapted to take onto said seats.

13. In a gas compressor provided with a cylinder, the combination of a housing integral with the side wall of the cylinder, said housing being provided with a number of partitions so as to provide intervening passages and having an opening extending through the housing at an angle to said passages, one of the passages constituting an intake passage, another passage constituting a discharge passage, while the third or intermediate passage communicates with the cylinder interior, a set of cylindrical valve cages removably secured in opposite ends of the opening in the housing with the inner ends of the cages arranged in proximity to each other and coincident with the passage communicating with the cylinder interior, said inner ends of the cages being provided with valve seats while the side walls of the cages are provided with openings or ports communicating with the intake and discharge passages respectively, and valves reciprocatingly mounted in each of said cages whereby communication between the intake passage and intermediate passage and between the discharge passage and the intermediate passage may be controlled.

HENRY W. JACOBS.
HOWARD H. LANNING.

Witnesses:
GEORGE HEIDMAN,
NORMAN A. STREET.

Copies of this patent may be obtained for five cents each, by addressing the "Commissioner of Patents, Washington, D. C."